R. ULRICH.
CUSHION ATTACHMENT FOR WHEELS.
APPLICATION FILED JAN. 25, 1911.

999,609.

Patented Aug. 1, 1911.

2 SHEETS—SHEET 1.

Inventor
Roy Ulrich.

Witnesses
William Smith.

By Victor J. Evans
Attorney

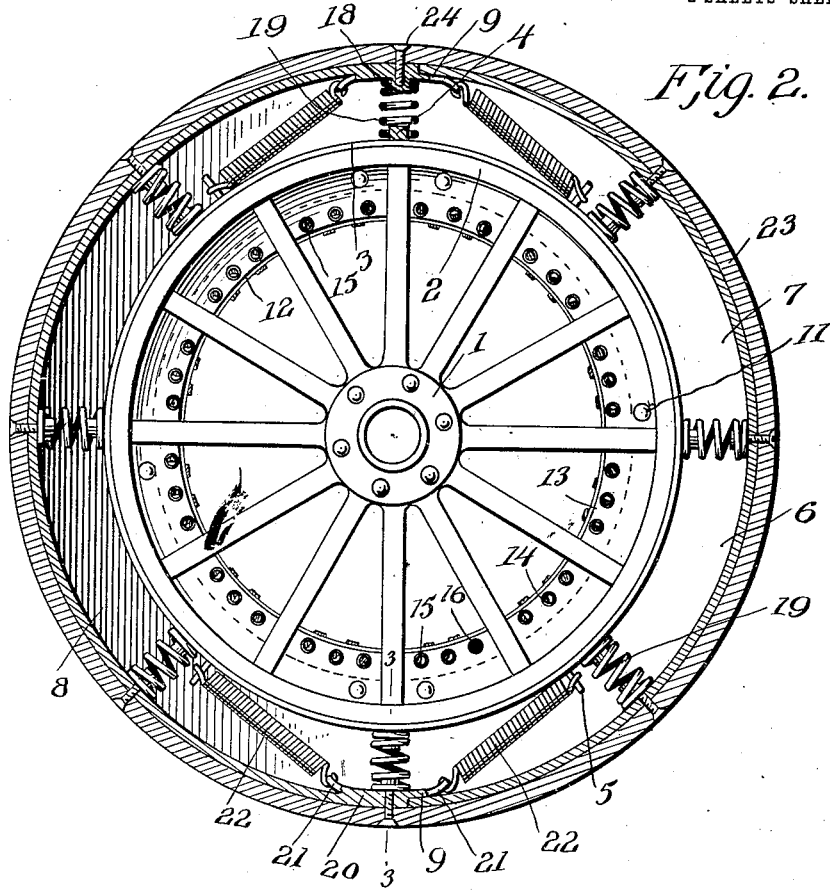
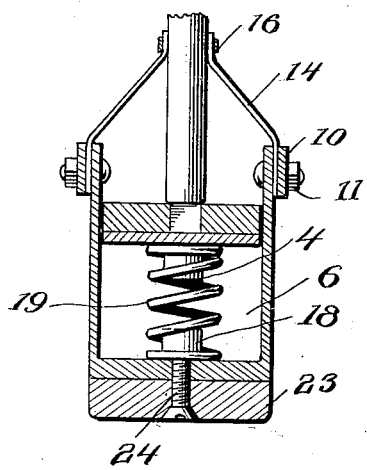

UNITED STATES PATENT OFFICE.

ROY ULRICH, OF OVERTON, NEBRASKA.

CUSHION ATTACHMENT FOR WHEELS.

999,609.  Specification of Letters Patent.  Patented Aug. 1, 1911.

Application filed January 25, 1911. Serial No. 604,644.

*To all whom it may concern:*

Be it known that I, ROY ULRICH, a citizen of the United States, residing at Overton, in the county of Dawson and State of Nebraska, have invented new and useful Improvements in Cushion Attachments for Wheels, of which the following is a specification.

This invention relates to wheels and more particularly to cushion tire attachments therefor.

The object of the invention is the provision of means for converting the ordinary wheel into a spring wheel without the use of the present type of pneumatic tire.

A further object of the invention is the provision of a spring tire mechanism adapted to be attached to the ordinary wheel, together with a flexible dust guard carried thereby and means to hold the dust guard in position which also holds the parts of the spring tire mechanism in place.

Further objects of the invention will appear as the following specific description is read in connection with the accompanying drawings, which form a part of this application, and in which:—

Figure 1:
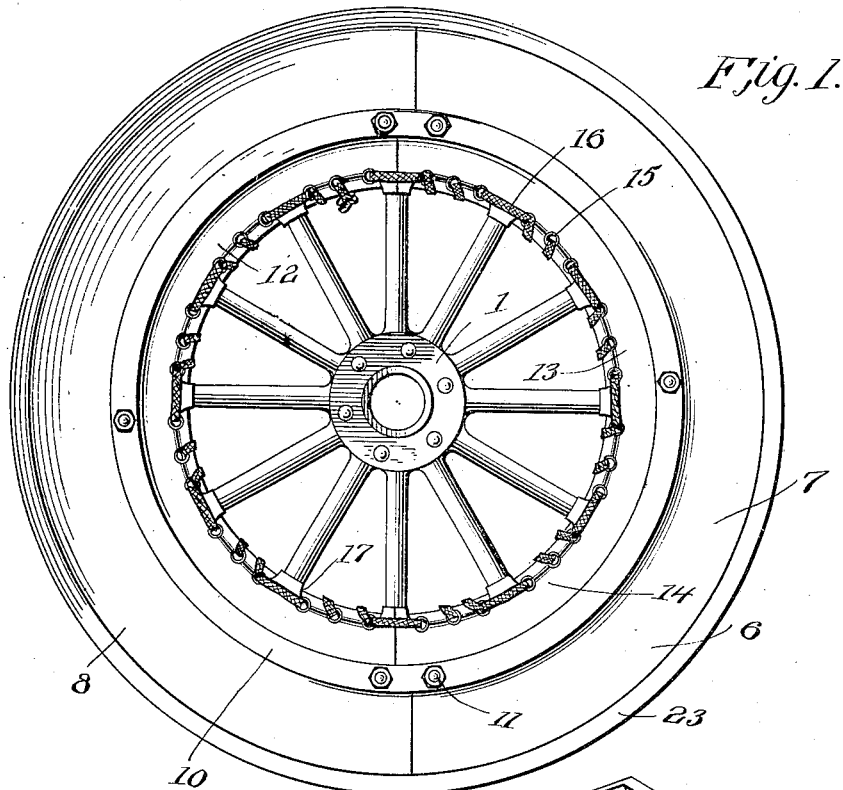
Figure 4:
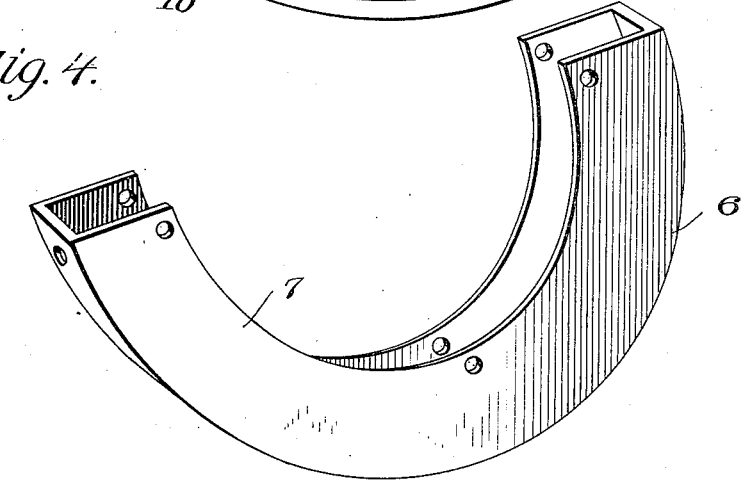

Figure 1 is a side elevation. Fig. 2 is a vertical sectional view. Fig. 3 is a transverse sectional view on the line 3—3 of Fig. 2. Fig. 4 is a detail perspective view of one of the casing sections.

Referring more particularly to the drawings, 1 represents a wheel having the ordinary felly 2 with its tire 3 and projecting from the tire at intervals around its circumference are studs 4 which may be placed thereon in any suitable manner. Arranged upon opposite sides of certain of the studs are eye bolts 5 which are secured by being passed through the felly 2 and tire 3.

The tire 3 and felly 2 are covered by a casing 6 which is constructed in two parts 7 and 8, both of which are substantially U-shaped in cross section and are semi-circular in outline, so that when joined together they are of sufficient circumference to encircle the wheel and be spaced therefrom. The section 8 is provided with circumferentially projecting lips 9 at its ends which are adapted to lie beneath the tread portion of the section 7. The separate sections of the casing are connected together by metallic rings 10 which are placed around on opposite sides of the inner edges of the casing and are secured thereto by bolts 11. These bolts are arranged at suitable intervals and hold the ring down upon arcuate sections 12 and 13 of the leather guard 14. Each section 12 and 13 of the guard comprises separate members which are secured to the casing upon opposite sides of the wheel and have lacing openings 15 in which are secured the lacing members 16 so as to hold the free edges of the guard members together. The guard members are preferably slightly scalloped, as shown at 17, where they are placed around the spokes of the wheel so that the separate members of the guard will not tightly engage the spokes but will be permitted to slide up and down thereon.

Secured to the inner side of the tread portion of the casing sections are studs 18 which are arranged directly opposite to the studs 4 on the tire 3 and bridged between the studs 18 and 4 are spiral springs 19 which normally hold the casing sections separated from the tire. In order to prevent circumferential creeping of the sections, certain of the studs 18 are mounted upon attaching plates 20, each of which have lateral ears 21 apertured to receive one end of diagonally arranged springs 22 whose opposite ends are connected to the eye bolts 5. Four of these springs only are generally necessary but the arrangement may be duplicated as many times as is found necessary in practice.

By unlacing the lacing members and disconnecting the rings 10 from the sections 7 and 8 the casing may be removed from the wheel for repairs or for any other suitable purpose. By simply placing the studs and eye bolts on the ordinary wheel now in use, the attachment consisting of the separate parts of the casing, the flexible guard members, and the rings may be attached to the ordinary wheel.

Mounted upon the tread portion of the casing sections is a metallic tire 23 which is secured in position by bolts 24 which are countersunk into the tire and are operated from without so that the tire may be removed from the casings prior to the removing of the said casing.

Having thus described the invention, what I claim as new is:—

In a device of the class described, the combination with a wheel, of a two-part casing comprising substantially U-shaped members in cross section, rings connecting the separate parts of said casing, arcuate flexible guard members secured to the separate parts of the casing on opposite sides thereof by the rings, lacing members to join the free edges of said guard members, a tire removably mounted around the casing, means to resiliently hold the casing separated from the wheel, and resilient members for preventing circumferential creeping of the casing on the wheel.

In testimony whereof I affix my signature in presence of two witnesses.

ROY ULRICH.

Witnesses:
August J. Ulrich,
D. T. Boyles.

Copies of this patent may be obtained for five cents each, by addressing the "Commissioner of Patents, Washington, D. C."